(12) United States Patent
Lee et al.

(10) Patent No.: US 12,088,744 B2
(45) Date of Patent: Sep. 10, 2024

(54) MOBILE TERMINAL

(71) Applicant: LG ELECTRONICS INC., Seoul (KR)

(72) Inventors: Jiho Lee, Seoul (KR); Byunghwa Lee, Seoul (KR); Jaeyoung Han, Seoul (KR); Minsoo Kim, Seoul (KR); Kyunghwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 17/616,300

(22) PCT Filed: Jun. 24, 2019

(86) PCT No.: PCT/KR2019/007596
§ 371 (c)(1),
(2) Date: Dec. 3, 2021

(87) PCT Pub. No.: WO2020/262713
PCT Pub. Date: Dec. 30, 2020

(65) Prior Publication Data
US 2022/0311844 A1 Sep. 29, 2022

(51) Int. Cl.
*H04M 1/02* (2006.01)
*G06F 1/16* (2006.01)

(52) U.S. Cl.
CPC ........ *H04M 1/0237* (2013.01); *G06F 1/1624* (2013.01); *G06F 1/1652* (2013.01);
(Continued)

(58) Field of Classification Search
None
See application file for complete search history.

(56) References Cited

U.S. PATENT DOCUMENTS 7,965,258 B2    6/2011   Aoki
10,448,521 B2 * 10/2019  Seo ...................... H05K 1/0203
(Continued)

FOREIGN PATENT DOCUMENTS

CN     108259649 A      7/2018
CN     108520702 A  *   9/2018  ............. G09F 9/301
(Continued)

*Primary Examiner* — Gennadiy Tsvey
(74) *Attorney, Agent, or Firm* — Birch, Stewart, Kolasch & Birch, LLP (57) ABSTRACT

A mobile terminal comprises: a first frame; a second frame configured to make a sliding movement in a first direction with regard to the first frame, or in a second direction opposite to the first direction; a rotating gear coupled to the second frame to be able to rotate around an axis of rotation extending in a third direction perpendicular to the first direction; a flexible display unit comprising a first area coupled to the front surface of the first frame and a second area which is bent while surrounding the rotating gear; a first flexible rack gear extending from the first frame in the first direction, the first flexible rack gear being positioned between the flexible display unit and the second frame and being bent while surrounding the rotating gear; and a second flexible rack gear coupled to the back surface of the flexible display unit so as to engage with the rotating gear and rotate accordingly. When expanded, the mobile terminal can be stably supported, thereby solving the problem of sagging of the flexible display unit, or the problem of an error occurring during a touch input.

11 Claims, 8 Drawing Sheets

(52) U.S. Cl.
CPC ...... *H04M 1/0268* (2013.01); *H04M 2201/08* (2013.01); *H04M 2201/38* (2013.01)

(56) References Cited

U.S. PATENT DOCUMENTS

| | | | |
|---|---|---|---|
| 2005/0079902 A1* | 4/2005 | Chen | H04M 1/0237 |
| | | | 455/575.8 |
| 2013/0058063 A1* | 3/2013 | O'Brien | G06F 1/1624 |
| | | | 361/807 |
| 2015/0325804 A1* | 11/2015 | Lindblad | H10K 59/40 |
| | | | 313/511 |
| 2017/0212556 A1* | 7/2017 | Jovanovic | G06F 1/1652 |
| 2018/0103552 A1* | 4/2018 | Seo | H05K 5/0017 |
| 2019/0268455 A1* | 8/2019 | Baek | G06F 1/1684 |
| 2020/0033913 A1* | 1/2020 | Yang | H04M 1/0268 |
| 2020/0060028 A1* | 2/2020 | Kim | H04M 1/0268 |
| 2020/0314225 A1* | 10/2020 | Ahn | G09F 9/301 |
| 2021/0044683 A1* | 2/2021 | He | G06F 1/1652 |
| 2022/0155823 A1* | 5/2022 | Shin | G09F 9/301 |

FOREIGN PATENT DOCUMENTS

| | | | | |
|---|---|---|---|---|
| KR | 10-2016-0097033 A | 8/2016 | | |
| KR | 20170116551 A1 * | 10/2017 | | G06F 1/1652 |
| KR | 10-2018-0005476 A | 1/2018 | | |
| KR | 10-2018-0039799 A | 4/2018 | | |
| KR | 10-2019-0004618 A | 1/2019 | | |
| KR | 10-2019-0020000 A | 2/2019 | | |
| KR | 10-2019-0062855 A | 6/2019 | | |
| WO | WO-2020211948 A1 * | 10/2020 | | G06F 1/1624 |

* cited by examiner

FIG. 8

MOBILE TERMINAL

CROSS REFERENCE TO RELATED APPLICATIONS

This application is the National Phase of PCT International Application No. PCT/KR2019/007596, filed on Jun. 24, 2019, which is hereby expressly incorporated by reference into the present application.

TECHNICAL FIELD

The present disclosure relates to a mobile terminal, and more particularly to a mobile terminal having a flexible display and capable of expanding the size of a screen located at a front surface thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying an image that a user can watch. The display device may receive, for example, a broadcast program selected by a user among broadcast signals transmitted from a broadcast station, may separate an image signal from the received signals, and may again display the separated image signal on the display.

In recent times, due to the development of broadcast technology and network technology, functions of display devices have been significantly diversified, and performances of the devices have been improved accordingly. That is, the display devices have been developed to provide not only broadcast content but also other various content to users. For example, the display devices may provide users with not only programs received from broadcast stations, but also game play, listening to music, Internet shopping, user customized information, etc., using various applications. In order to perform such extended functions, the display device is basically connected to other devices or networks using various communication protocols, and provides a user with the ubiquitous computing environment. That is, display devices have evolved into smart devices that enable connectivity to a network and always-on computing.

On the other hand, a flexible display that has sufficient elasticity and can thus be greatly deformed has recently been developed. Such a flexible display can be deformed to the extent that it can be rolled up. The mobile terminal may include the rolled flexible display, and may allow the flexible display to protrude outward from a body to a desired size. Thus, the mobile terminal can have a more compact structure using the flexible display.

DISCLOSURE

Technical Problem

An object of the present disclosure is to provide a mobile terminal capable of improving durability of a flexible display unit because it does not limit a point where the flexible display unit is bent to a specific position.

Another object of the present disclosure is to provide a mobile terminal including a support structure of a flexible display unit such that it can stably support the flexible display unit in a situation where the flexible display unit is expanded.

Another object of the present disclosure is to provide a mobile terminal for allowing the flexible display to stably move without being pushed in a switching mode between a first state and a second state.

Technical Solutions

In accordance with an aspect of the present disclosure, a mobile terminal may include a first frame, a second frame configured to slidably move in a first direction with respect to the first frame or in a second direction opposite to the first direction, a rotary gear rotatably coupled to the second frame about a rotary shaft extending in a third direction perpendicular to the first direction, a flexible display unit configured to include a first region coupled to a front surface of the first frame, and a second region that is bent while surrounding the rotary gear, a first flexible rack gear formed to extend from the first frame in a first direction, disposed between the flexible display unit and the second frame, and formed to be bent while surrounding the rotary gear, and a second flexible rack gear coupled to a back surface of the flexible display unit, and configured to rotate while being engaged with the rotary gear.

In the rotary gear, a first portion formed to overlap the first flexible rack gear may be larger in size than a second portion formed to overlap the second flexible rack gear.

A diameter of the first portion of the rotary gear may be equal to a diameter of the second portion of the rotary gear, and a serrated pitch of the first flexible rack gear may be equal to a serrated pitch of the second flexible rack gear.

A diameter of the second portion of the rotary gear may be larger in size than a diameter of the first portion of the rotary gear; and a serrated pitch of the second flexible rack gear may be larger in size than a serrated pitch of the first flexible rack gear.

One pair of the second flexible rack gears may be arranged in the third direction, and the first flexible rack gear may be disposed between the two second flexible rack gears making the one pair.

A length of the first direction of the first flexible rack gear may be longer than a length of the first direction of the second flexible rack gear.

The first flexible rack gear may include a plurality of curved uneven portions formed on a surface facing the flexible display unit.

The plurality of curved uneven portions may extend in the third direction, and is arranged side by side in the first direction.

The first flexible rack gear may further include at least one guide protrusion located at both side surfaces arranged in the third direction, and the second frame may further include a guide rail formed to cover both side surfaces arranged in a second direction of the first flexible rack gear and formed to include a guide rail into which the guide protrusion is inserted.

The mobile terminal may further include a plurality of first magnets disposed in the first frame, and arranged in the first direction, and a second magnet disposed in the second frame, wherein the second magnet is magnetically coupled to one of the plurality of first magnets when the second frame moves in the first direction.

The mobile terminal may further include a third frame configured to move in the second or first direction with respect to the first frame, and disposed symmetrical to the second frame, a fixing groove formed in the first frame, and a fixing protrusion formed in each of the second frame and the third frame, and inserted into the fixing groove when pressed.

The second frame may further include a slide rail extending in the first direction such that both ends arranged in the third direction of the slide rail are configured to accommodate ends of the flexible display unit.

Advantageous Effects

As is apparent from the above description, the mobile terminal according to the embodiments of the present disclosure does not limit a point where the flexible display unit is bent to a specific position, thereby improving durability of the flexible display unit.

In addition, the embodiments of the present disclosure can stably support the mobile terminal in a situation where the mobile terminal is expanded, so that sagging of the flexible display unit can be prevented and occurrence of errors in touch input to the flexible display unit can also be prevented.

The mobile terminal according to the embodiments of the present disclosure can allow the flexible display unit to stably move without being pushed in a switching mode between a first state and a second state.

The mobile terminal according to the embodiments of the present disclosure includes a side portion for protecting a side surface where the flexible display unit is bent, thereby preventing the flexible display unit from being damaged by external impact.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Figure 1:
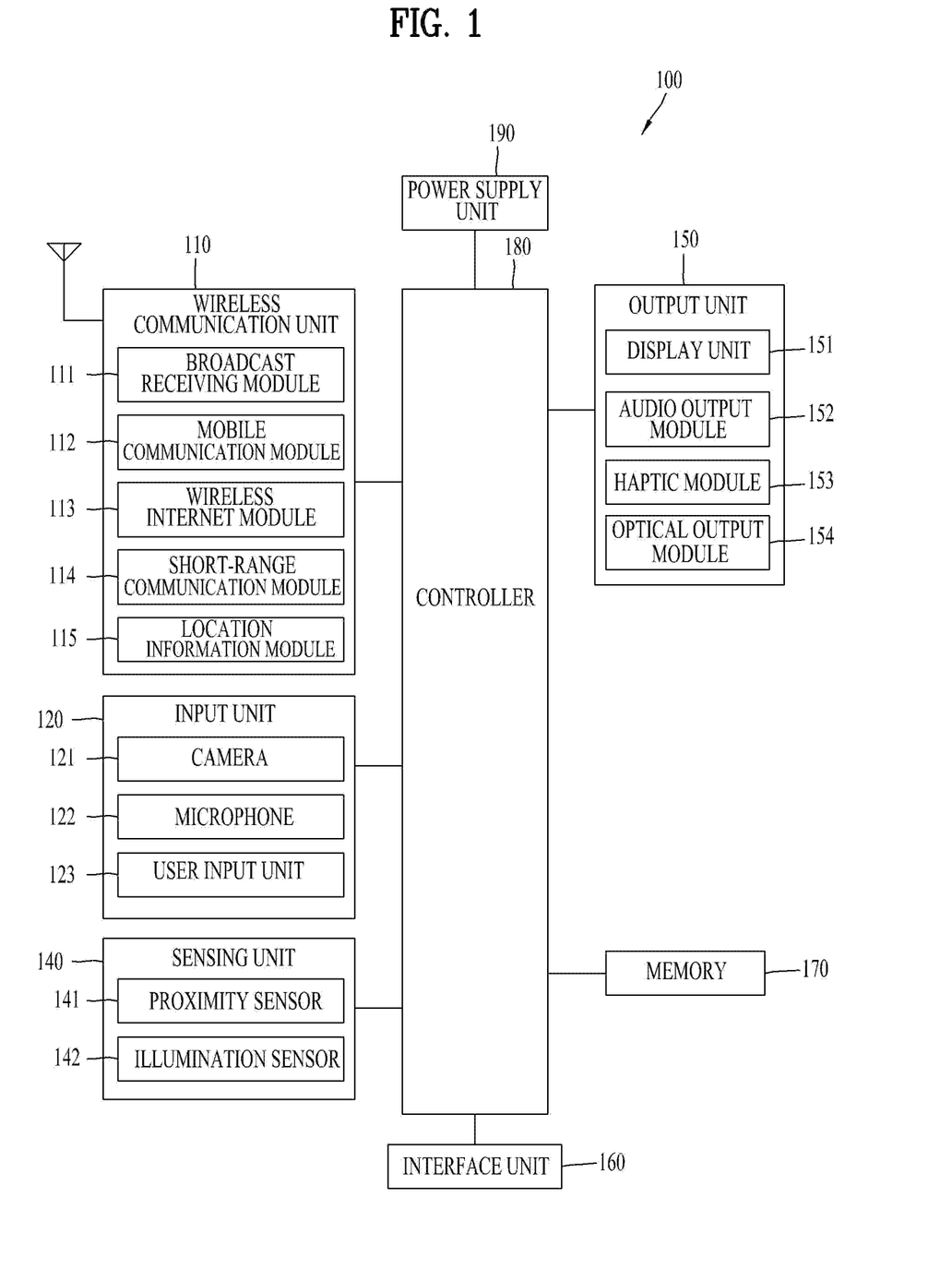
FIG. 1 is a block diagram of a mobile terminal in accordance with the present disclosure.

Terms such as "include" or "has" are used herein and should be understood that they are intended to indicate an existence of several components, functions or steps, disclosed in the specification, and it is also understood that greater or fewer components, functions, or steps may likewise be utilized FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. On the other hand, the virtual key or the visual key may be displayed on the touchscreen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
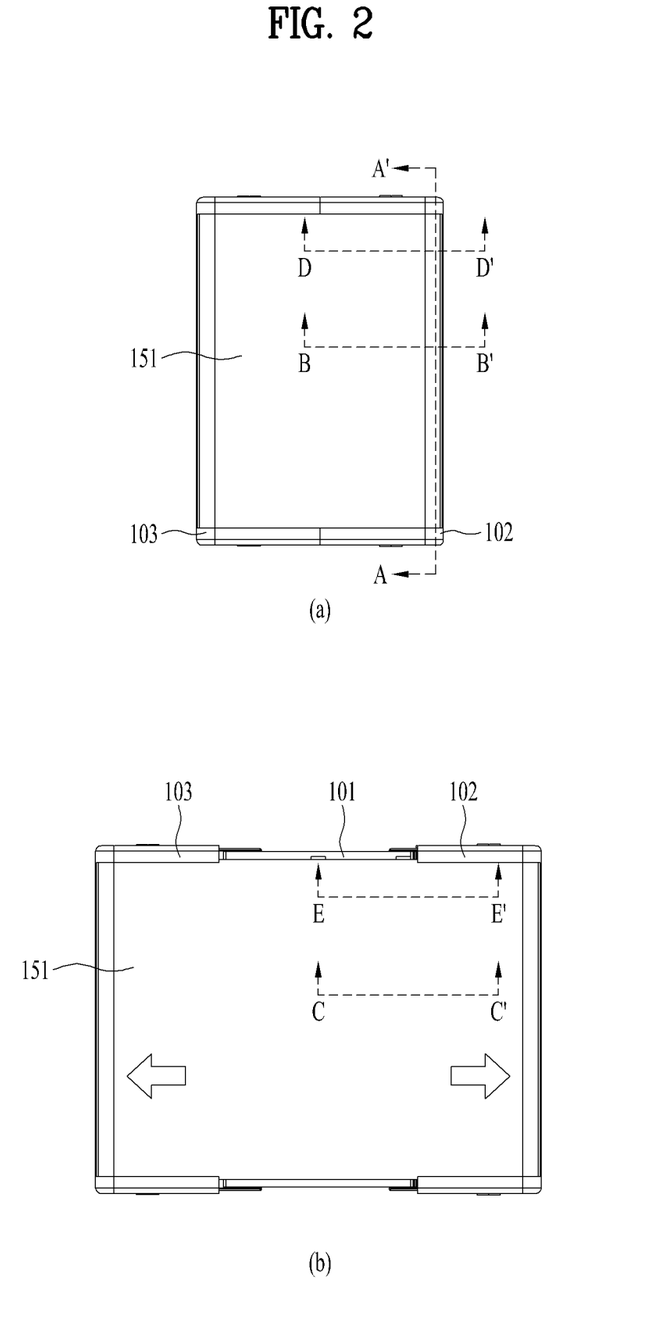
FIG. 2 is a front view illustrating a first state and a second state of a mobile terminal according to the present disclosure.

FIG. 2 is a front view illustrating a first state and a second state of a mobile terminal 100 according to the present disclosure. The mobile terminal 100 may be formed to be variable in a horizontal direction in a manner that the size of a screen located at a front surface of the mobile terminal 100 can be varied. A state in which the size of a screen located at the front surface of the mobile terminal is reduced as shown in FIG. 2(*a*) will hereinafter be referred to as a first state, and a state in which the size of a screen located at the front surface of the mobile terminal is expanded as shown in FIG. 2(*b*) will hereinafter be referred to as a second state.

The mobile terminal 100 may include a first frame 101, and a second frame 102 moving in a first direction from the first frame 101. Although the mobile terminal 100 includes the first frame 101 and the second frame 102 and can be extended only in one direction, the scope of the present disclosure is not limited thereto, and it should be noted that the mobile terminal 100 may further include a third frame 103 located symmetrical to the second frame 102 as necessary. Here, the first direction may refer to a right direction in which the second frame 102 is located, and a second direction may refer to a left direction in which the third frame 103 is located.

The mobile terminal according to the present disclosure may include not only the first state and the second state shown in FIG. 2, but also a third state (FIG. 8) in which only one of the second frame 102 and the third frame 103 is movable such that the screen of the mobile terminal can be expanded by half the screen size.

Since the third frame 103 is disposed opposite to the second frame 102 and all constituent elements of the third frame 103 are symmetrical in structure to those of the second frame 102, the description of the third frame 103 can be replaced with the description of the second frame 102 because the third frame 103 is different only in direction from the second frame 102.

In order to change the size of the screen in the horizontal direction, the flexible display unit may be used. The flexible display unit 151 may be manufactured on a thin and flexible substrate capable of being curved, bent, folded, twisted or rolled (curled) like paper while maintaining characteristics of the conventional flat panel display, and may refer to a display that is light in weight and is not easily broken.

The electronic paper (e-paper) may refer to display technology to which the characteristics of general inks are applied, and is different from the conventional flat panel display in view of the use of reflected light. The electronic paper (e-paper) may change information using a twist ball or via electrophoresis using a capsule.

In a state in which the flexible display unit 151 is not deformed (for example, a state having an infinite radius of curvature and referred to as a basic state), a display region of the flexible display unit 151 may become a flat surface. In a state that the flexible display unit 151 is deformed in the basic state by external force (for example, a state with a finite radius of curvature and referred to as a deformed state), the display region may become a curved surface or a bent surface. As illustrated, information displayed in the deformed state may be visual information displayed on the curved surface. The visual information may be realized in such a manner that light emission of each unit pixel (sub-pixel) arranged in a matrix form is controlled independently. The unit pixel denotes a minimum unit for representing one color.

According to one alternative embodiment, the first state of the flexible display unit 151 may be a curved state (for example, a state of being curved from up to down or from right to left), instead of being a flat state in the basic state. In this case, when external force is applied to the flexible display unit 151, the flexible display unit 251 may be deformed into the flat state (or a less curved state) or may be deformed into a more curved state.

On the other hand, the flexible display unit 151 may be combined with a touch sensor to implement a flexible touchscreen. When touch is received at the flexible touchscreen, the controller 180 (see FIG. 1) may perform control corresponding to the touch input. The flexible touchscreen may be configured to sense a touch input not only in the basic state but also in the deformed state.

The touch sensor may sense a touch (or a touch input) applied to the touchscreen using at least one of various touch methods such as a resistive film method, a capacity method, an infrared method, an ultrasonic method, a magnetic field method, etc.

As one example, the touch sensor may be configured to convert a pressure applied to a specific portion of the touchscreen or convert a change in capacitance occurring at a specific portion of the touchscreen into electrical input signals. The touch sensor may be configured to detect a location, an area, a pressure upon touch, a capacitance upon touch, and the like when a touch object applying touch to the touchscreen touches the touch sensor.

On the other hand, the mobile terminal 100 according to this modified example may include a deformation sensor capable of sensing deformation of the flexible display unit 151. The deformation sensing means may be included in the sensing unit 140 (see FIG. 1).

The deformation sensor may be included in the flexible display unit 151 or the case to sense information related to deformation of the flexible display unit 151. Examples of such information related to the deformation of the flexible display unit 151 may be a deformed direction in which the flexible display unit 151 is deformed, a deformed degree of the flexible display unit 151, a deformed position of the flexible display unit 151, and a deformed time of the flexible display unit 151, and an acceleration at which the deformed flexible display unit 151 is restored, and the like. In addition, such information related to the deformation of the flexible display unit 151 may further include a variety of information that can be sensed due to bending (or curving) of the flexible display unit 151.

In addition, the controller 180 may change information displayed on the flexible display unit 151 or may generate a control signal for controlling a function of the mobile terminal 100, based on information related to deformation of the flexible display unit 151. Here, the information related to deformation of the flexible display unit 151 may be sensed by the deformation sensor.

The flexible display unit 151 may include a first region which is fixed to the first frame 101 and is always located on the front surface, and a second region which is located inside or in the rear direction of the mobile terminal 100 in the first state. When the second region transitions to the second state, at least a portion of the second region may move toward the front surface of the mobile terminal 100 or may be located in a lateral direction of the mobile terminal 100.

Each of both ends of the mobile terminal 100 arranged in the horizontal direction may include a curved surface having a predetermined curvature such that the flexible display unit 151 can move in a forward or backward direction without being folded.

Figure 3:
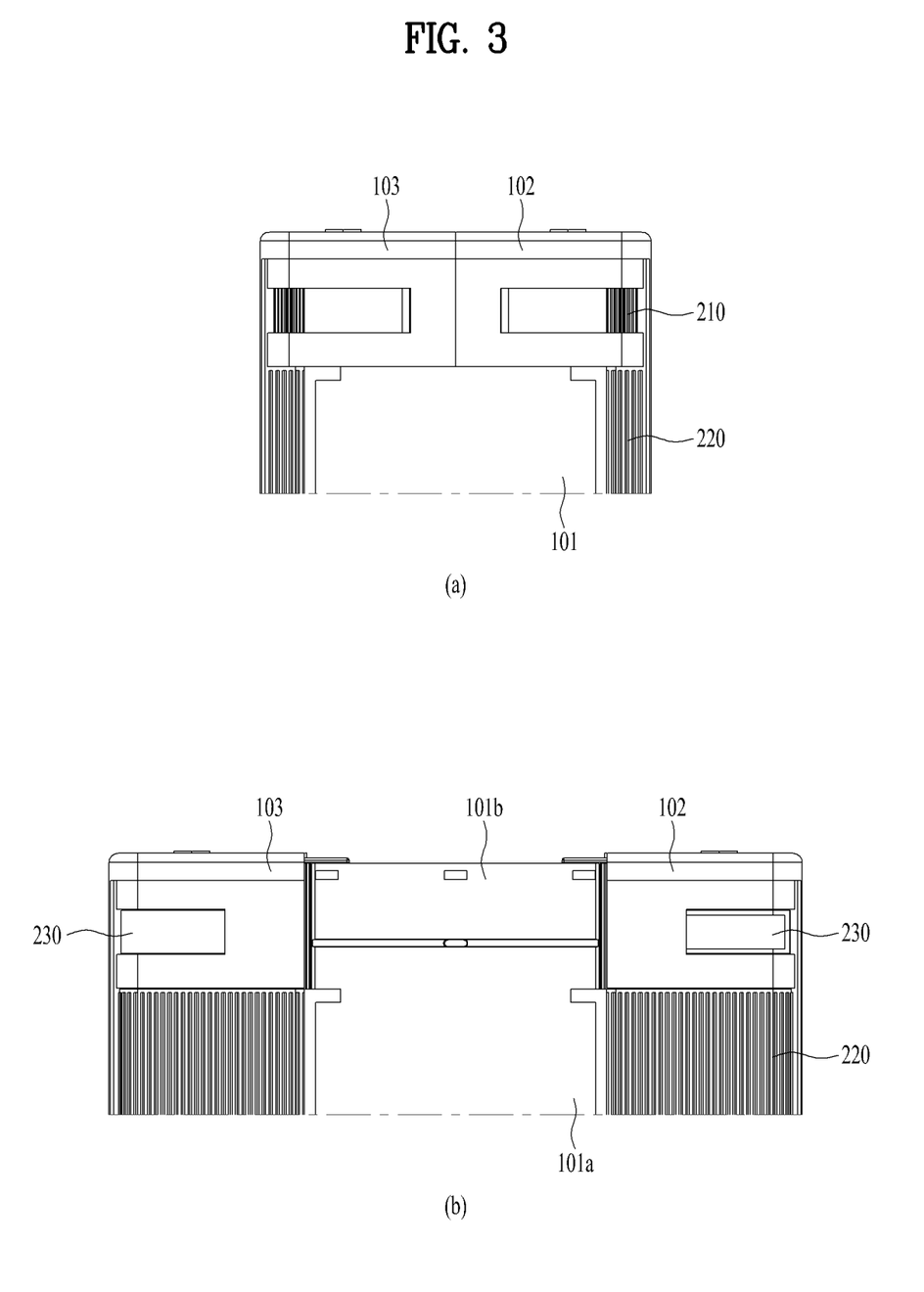
FIG. 3 is a front view illustrating the appearance of the mobile terminal from which flexible display unit is omitted when the mobile terminal is in a first state or a second state.

FIG. 3 is a front view illustrating the appearance of the mobile terminal 100 from which the flexible display unit 151 is omitted when the mobile terminal 100 is in the first state or the second state. In more detail, as can be seen from FIG. 3(a), the first to third frames 101~103 of the mobile terminal 100 staying in the first state are illustrated, and the second frame 102 and the third frame 103 are arranged to overlap with the first frame 101. As can be seen from FIG. 3(b), the first to third frames 101~103 of the mobile terminal 100 staying in the second state are illustrated, and the second frame 102 and the third frame 103 move so that the area overlapping the first frame 101 is reduced in size.

The first region of the flexible display unit 151 is coupled to an attachment region 101a that directly contacts the display unit in the first state of the first frame 101. The position of the first region is fixed to the first frame 101, but the second region is not coupled to the first to third frames 101 to 103, so that the positional relationship between the second frame 102 and the third frame 103 may vary depending on the sliding movement of the second frame 102 and the third frame 103.

When the mobile terminal 100 transitions from the first state to the second state as shown in FIG. 3(a), the second frame 102 and the third frame 103 are located in the expanded region. At this time, a step difference may occur in the forward direction among the attachment region of the first frame 101, the second frame 102, and the third frame 103. The flexible display unit 151 overlapping the step difference may be pressed, causing a problem in which a mark remains. In addition, when touch input is applied to the second region of the expanded flexible display unit 151, the flexible display unit 151 is not in close contact with either the second frame 102 or the third frame 103 located on the back surface of the second region, resulting in occurrence of input errors.

When a thickness corresponding to the step difference is attached to the back surface of the flexible display unit 151 so as to compensate for the step difference, a length tolerance caused by the radius of curvature may occur in the bent portion of the end portion of each of the second frame 102 and the third frame 103. If the length tolerance caused by the radius of curvature occurs, it is difficult for the flexible display unit 151 to be pushed or to transition from the first state to the second state or vice versa.

Therefore, as shown in FIG. 3, the mobile terminal according to the present disclosure may further include a first flexible rack gear 220 coupled to both ends of the first frame 101 arranged in the horizontal direction. The rack gear includes a soft material. Thus, in the first state, the rack gear may be bent in the backward direction in the same manner as in the first flexible display unit 151, and in the second state, the rack gear may move in the forward direction, so that the rack gear can be disposed in the expanded front surface region. As a result, it is possible to compensate for a step difference between the attachment region of the first frame 101 and each of the second frame 102 and the third frame 103.

Figure 4:
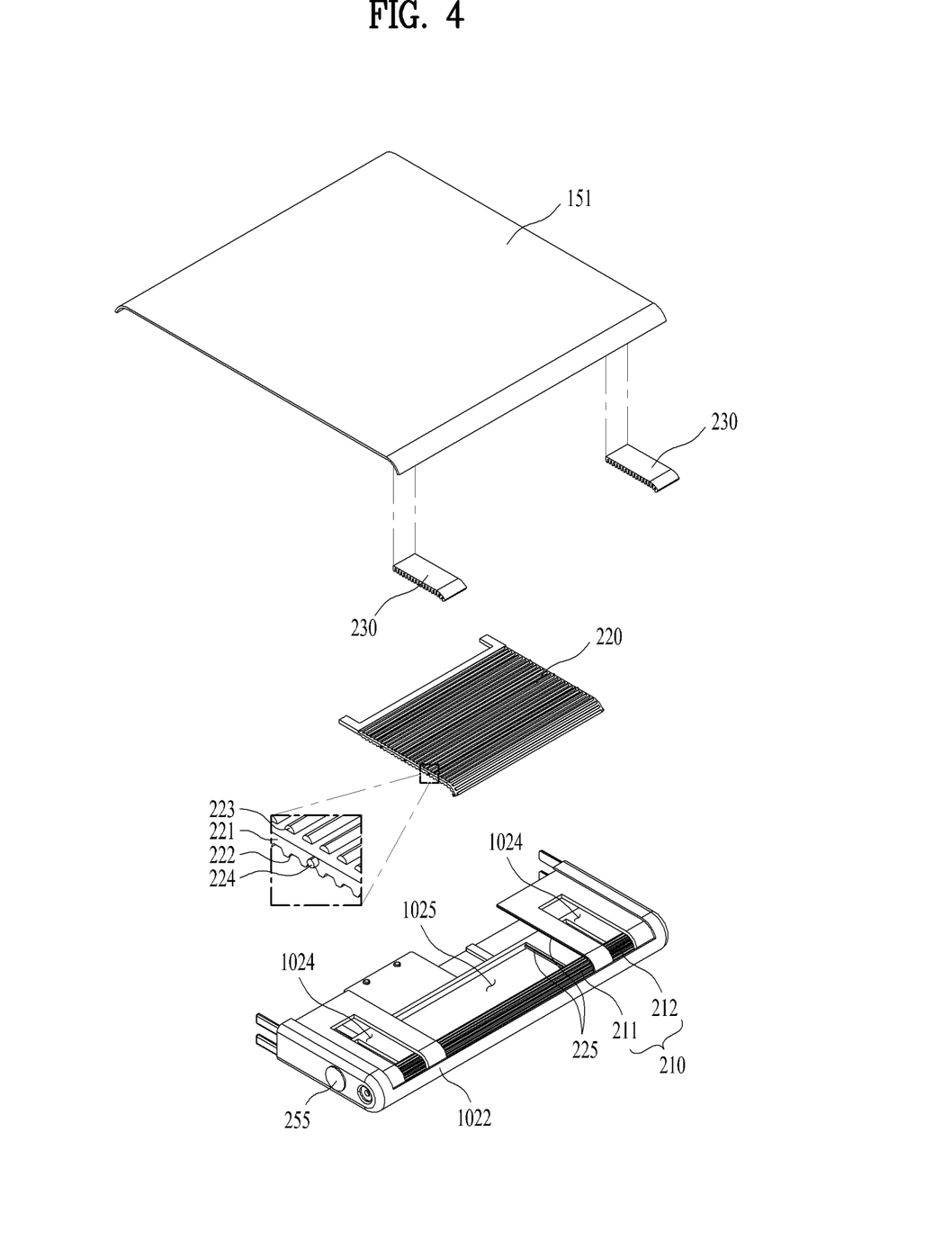
FIG. 4 is a diagram illustrating a gear unit of the mobile terminal according to the present disclosure.
Figure 5:
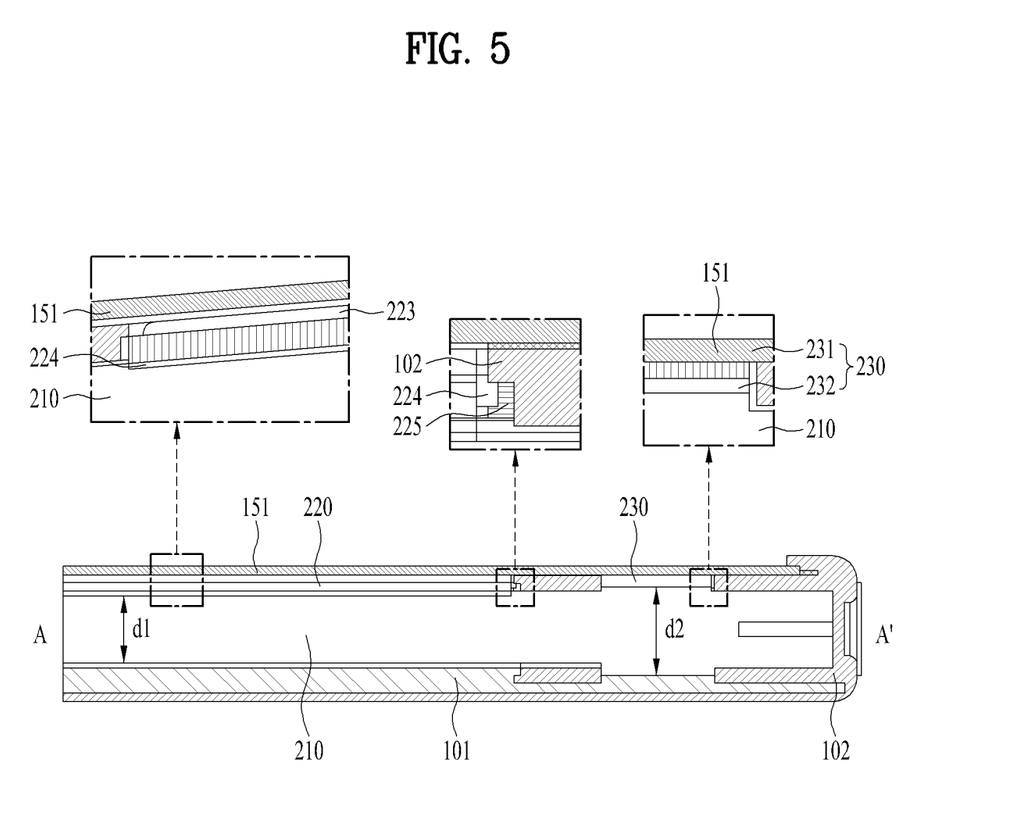
FIG. 5 is a cross-sectional view illustrating the mobile terminal taken along the line A-A' shown in FIG. 2.

FIG. 4 is a diagram illustrating a gear unit of the mobile terminal 100 according to the present disclosure, and FIG. 5 is a cross-sectional view illustrating the mobile terminal 100 taken along the line A-A' shown in FIG. 2. The first flexible rack gear 220, the second flexible rack gear, the rotary gear 210, and the flexible display unit 151 are illustrated in FIG. 4. Only a part of the flexible display unit 151 is coupled to the second frame 102, and has the same structure as in the third frame 103.

The mobile terminal may further include a rotary gear 210 rotatably coupled to the second frame 102 about a rotary shaft extending in a third direction perpendicular to the first direction with respect to the second frame 102. The rotary gear 210 may be a member in which teeth are formed around a cylindrical bar extending in the third direction. As shown in FIG. 4, the first flexible rack gear 220 may be fastened to the second frame 102, and may surround the rotary gear 210, so that the teeth of the rotary gear 210 and the teeth 222 of the first flexible rack gear 220 are meshed and moved.

One side of the first flexible rack gear 220 may be coupled to the first frame 101 and may extend in the first direction, so that the first flexible rack gear 220 may be partially bent in the backward direction in the first state and may be disposed in the forward direction in the second state. The first flexible rack gear 220 may support a back surface of the second region of the flexible display unit 151.

When the second frame 102 moves in the first direction or in the second direction, the first flexible rack gear 220 is fixed to the first frame 101, and thus the position of the first flexible rack gear 220 overlapping the rotation gear 210 may be changed. In this case, the rotary gear 210 may rotate in engagement with the teeth 222 of the first flexible rack gear 220. In the drawings, when the mobile terminal 100 transitions from the first state to the second state, the rotary gear 210 may rotate clockwise. When the mobile terminal 100 transitions from the second state to the first state, the rotary gear 210 may rotate counterclockwise.

The first flexible rack gear 220 may include a guide rail 225 in which a guide protrusion 224 protrudes in a lateral direction and is inserted into the second frame 102 surrounding the first flexible rack gear 220. The guide protrusion 224 and the guide rail 225 may allow the first flexible rack gear 220 to stably support the back surface of the flexible display unit 151 in a situation where the first flexible rack gear 220 is not twisted or is not separated from the flexible display unit 151, so that the first flexible rack gear 220 may move in close contact with the rotary gear 210.

The first flexible rack gear 220 may have teeth 222 formed on one surface of the flexible base portion 221, and the other surface of the flexible base portion 221 may be arranged to face the flexible display unit 151. If the thickness of the flexible base portion 221 is too thick, the curvature of a portion that is bent while being meshed (or engaged) with the rotary gear 210 may increase, and one surface of the flexible base portion 221 may be different in a radius of curvature from the other surface of the flexible base portion 221. Instead of thinly forming the thickness of the base portion 221, curved uneven portions 223 may be formed at the other surface of the base portion 221 to compensate for an insufficient thickness of the base portion 221.

When using angled uneven portions, there is a possibility that stabbed portions occur in the flexible display unit 151 so that the flexible display unit 151 may be formed to have a curved surface to prevent occurrence of such stabbed portions. For rigidity of the first flexible rack gear 220, each of the curved uneven portions 223 may be formed in a bar shape extending in a third direction. The curved uneven portions extending in the third direction may minimize the influence of the first flexible rack gear 220 that is curved in the first direction while surrounding the rotary gear 210.

When switching from the first state to the second state, the second region of the flexible display unit 151 can naturally move forward. In contrast, when switching from the second state to the first state, the second region of the flexible display unit 151 may be separated from the frame without moving backward, so that the second region may come off of the frame. In order to address this issue, when the second frame 102 moves in the second direction, rotational force of the rotary gear 210 can be used to move the flexible display unit 151 in a backward direction. As described above, when the second frame 102 moves in the first or second direction with respect to the first frame 101, the rotary gear 210 may rotate according to a change in position between the first flexible rack gear 220 and the rotary gear 210. In order to transmit rotational force of the rotary gear 210 to the flexible display unit 151, the second flexible rack gear 230 may be used.

The second flexible rack gear 230 may include sawteeth 232 that are coupled to the back surface of the flexible display unit 151 and rotate by meshing with teeth of the rotary gear 210. When the plate-shaped base portion 231 has a thick thickness, tolerance according to the radius of curvature may occur in a portion where the flexible display unit 151 is bent, it is more advantageous for the second flexible rack gear 230 to have as thin a thickness as possible as well as to have a shorter length extending in the first direction than the first flexible rack gear 220. The second flexible rack gear 230 may receive the rotational force of the rotary gear 210. Although the second flexible rack gear 230 has a shorter length than the first flexible rack gear 220 configured to provide the rotary gear 210 with the rotational force, there is no difficulty in movement of the flexible display unit 151.

One pair of the second flexible rack gears 230 may be provided at both sides of the first flexible rack gear 220 so that the flexible display unit 151 can stably move without being twisted. For convenience of description, a portion of the rotary gear 210 overlapping the first flexible rack gear 220 may be referred to as a first portion 211, and a portion of the rotary gear 210 overlapping the second flexible rack gear 230 may be referred to as a second portion 212.

The second frame 102 may include an opening 1025 formed to expose the first portion 211 and an opening 1024 formed to expose the second portion 212. The opening 1025 may extend in the first direction in which the first flexible rack gear 220 can move, and the opening 1024 may extend in the second direction in which the second flexible rack gear 230 can move. As shown in FIG. 4, the second frame 102 may further include a rear cover 1022 formed to cover the flexible display unit 151 bent in a backward direction. In this case, the openings 1025 and 1024 may be covered by the rear cover 1022.

The above-described guide rail 225 may be formed in the opening 1025.

When the rotary gear 210 is implemented to have the same thickness, the first portion 211 and the second portion 212 may have the same diameter. However, as described above, since the base portion 231 of the second flexible rack gear 230 is formed to have a thin thickness, the length of the sawteeth 232 of the second flexible base portion 231 becomes too long.

As shown in FIG. 5, although the diameter (d2) of the second portion 212 is larger than the diameter (d1) of the first portion 211 such that the length of the sawteeth 232 of the second flexible rack gear 230 is shortened, the rotary gear 210 and the sawteeth 232 of the second flexible rack gear 230 are meshed (or engaged) with each other and moved.

Figure 6:
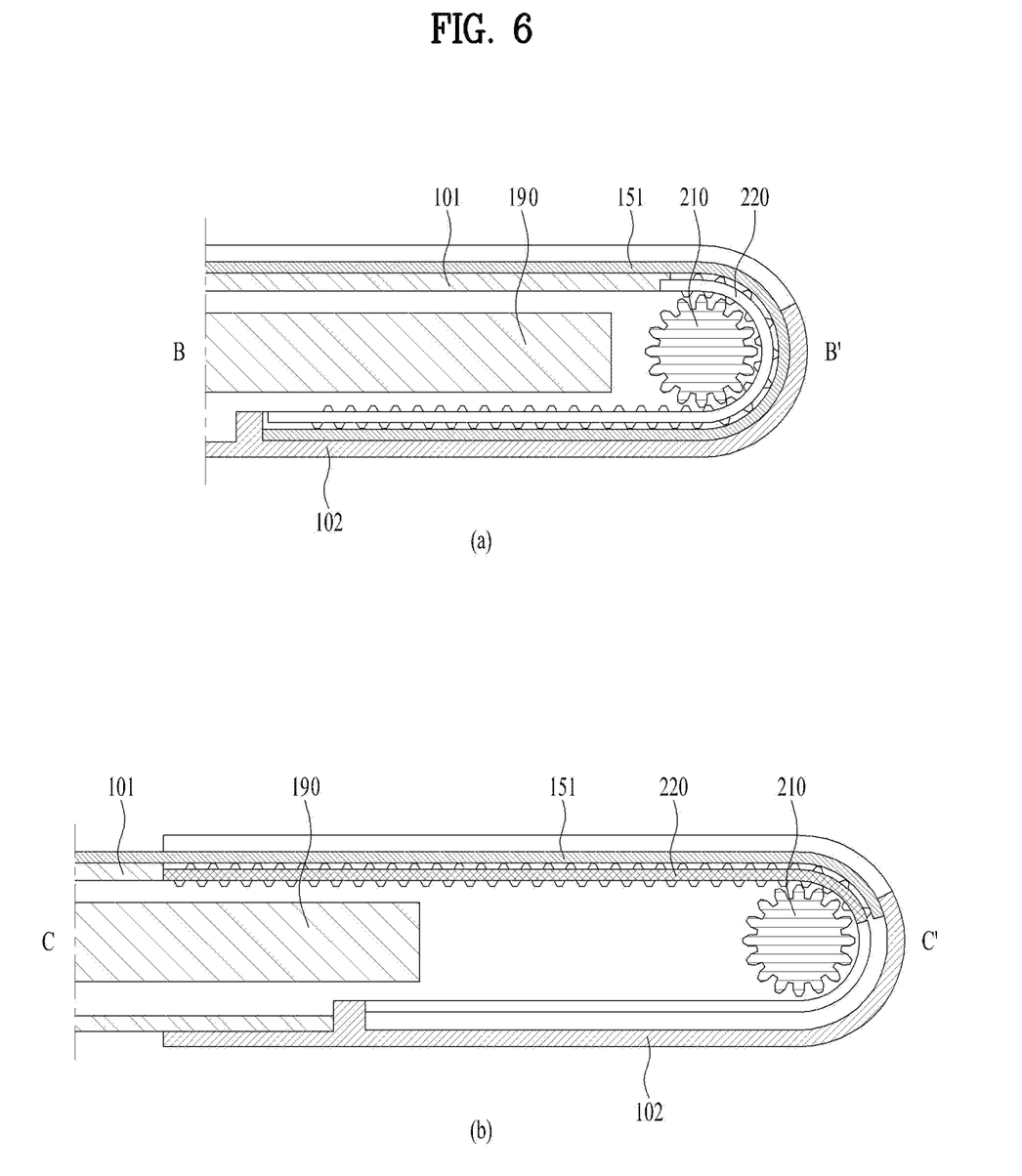
FIG. 6(a) is a cross-sectional view illustrating the mobile terminal taken along the line B-B' shown in FIG. 2.
FIG. 6(b) is a cross-sectional view illustrating the mobile terminal taken along the line C-C' shown in FIG. 2.

FIG. 6(a) is a cross-sectional view illustrating the mobile terminal taken along the line B-B' shown in FIG. 2, and FIG. 6(b) is a cross-sectional view illustrating the mobile terminal taken along the line C-C' shown in FIG. 2. In more detail, FIG. 6(a) illustrates the coupling state between the first flexible rack gear 220 and the rotary gear 210 in the first state, and FIG. 6(b) illustrates the coupling state between the first flexible rack gear 220 and the rotary gear 210 in the second state.

One end of the first flexible rack gear 220 is fixed to the first frame 101. Thus, in the first state, the first flexible rack gear 220 may surround the rotary gear 210 and most of the area of the first flexible rack gear 220 is located in a backward direction. In this case, the backward direction means that the first flexible rack gear 220 is located in a backward direction more than the rotary gear 210.

When the second frame 102 slides in the first direction and transitions to the second state, the first flexible rack gear 220 may move in the forward direction. Here, the forward direction means that the first flexible rack gear 220 is located in a forward direction more than the rotary gear 210. The rotary gear 210 may rotate counterclockwise as shown in the drawings. Conversely, when the second frame 102 transitions from the second state to the first state, the rotary gear 210 may rotate clockwise as shown in the drawings.

Figure 7:
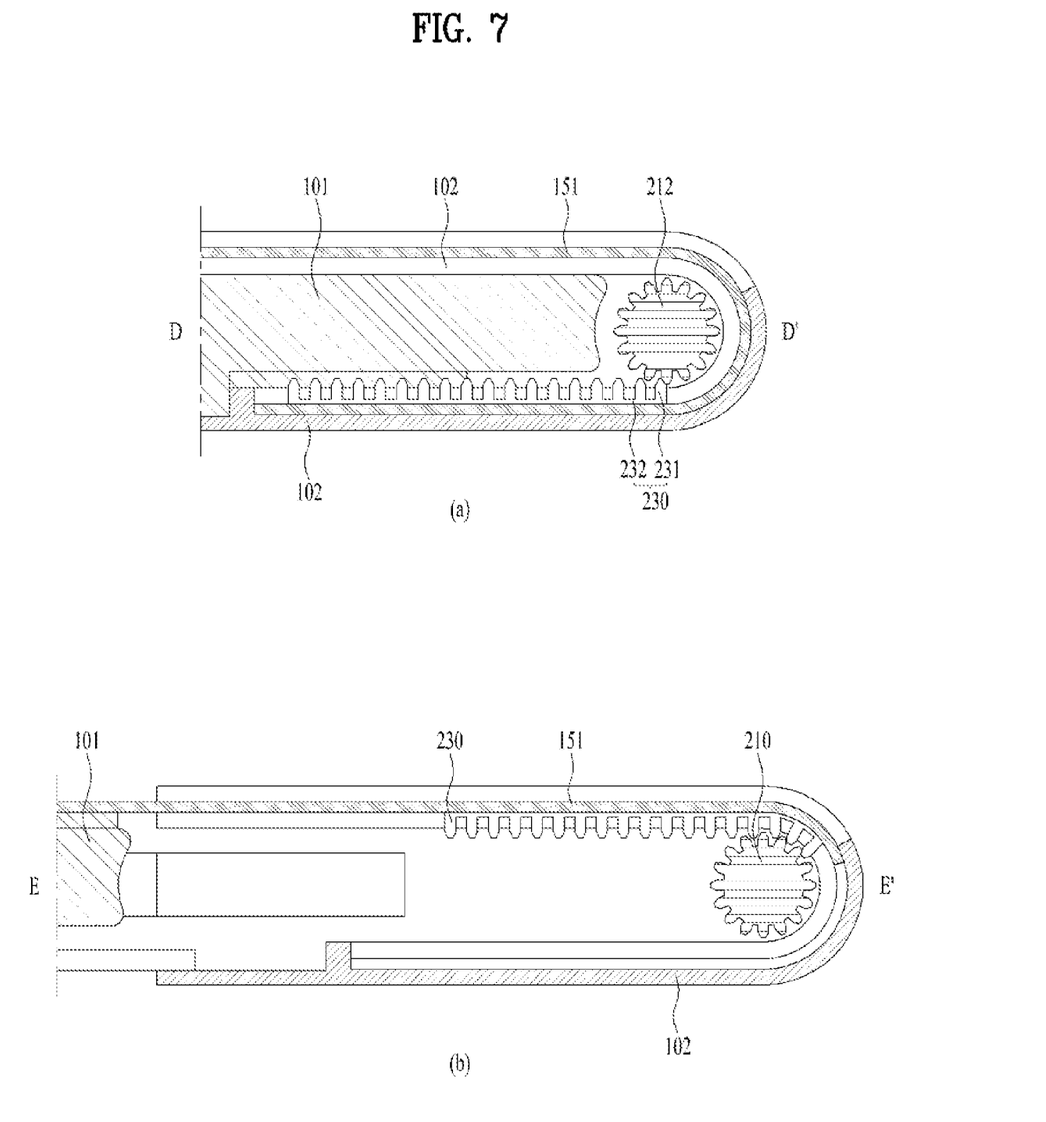
FIG. 7(a) is a cross-sectional view illustrating the mobile terminal taken along the line D-D' shown in FIG. 2.
FIG. 7(b) is a cross-sectional view illustrating the mobile terminal taken along the line E-E' shown in FIG. 2.

FIG. 7(a) is a cross-sectional view illustrating the mobile terminal taken along the line D-D' shown in FIG. 2, and FIG. 7(b) is a cross-sectional view illustrating the mobile terminal taken along the line E-E' shown in FIG. 2. In more detail, FIG. 7(a) illustrates the coupling state between the second flexible rack gear 230 and the rotary gear 210 in the first state, and FIG. 7(b) illustrates the coupling state between the second flexible rack gear 230 and the rotary gear 210 in the second state.

In the first state, the second flexible rack gear 230 may be located in the backward direction. When switching from the first state to the second state, the rotary gear 210 may rotate counterclockwise and the second flexible rack gear 230 may move in the forward direction. As a result, at least a portion of the second region of the flexible display unit 151 may move in the forward direction.

When switching from the second state to the first state, the rotary gear 210 may rotate clockwise, so that the second flexible rack gear 230 may move in the backward direction as shown in FIG. 7(a) and the second region of the flexible display unit 151 may also move in the backward direction.

That is, in the first state, the second region disposed in the backward direction may be formed to occupy a larger region. In the second state, the second region disposed in the forward direction may be formed to occupy a large region.

That is, the gear unit composed of the rotary gear 210, the first flexible rack gear 220, and the second flexible rack gear 230 may allow force capable of moving the second frame 102 to be transferred to the flexible display unit 151, and may allow the flexible display unit 151 to interact with the second frame 102, so that the gear unit can assist the flexible display unit 151 to move without separation of the flexible display unit 151.

Figure 8:
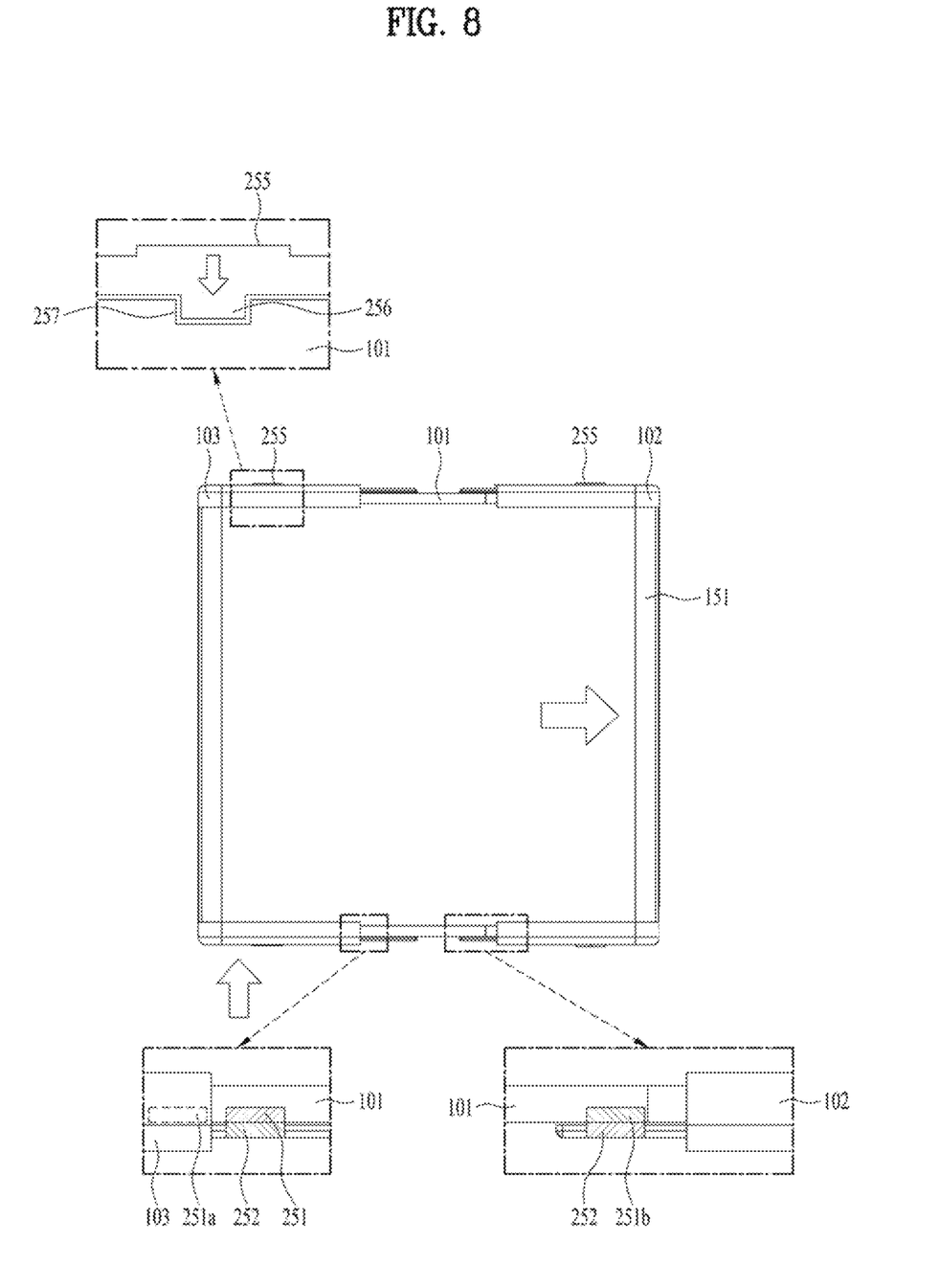
FIG. 8 is a front view illustrating a third state of the mobile terminal according to the present disclosure.

FIG. 8 is a front view illustrating a third state of the mobile terminal 100 according to the present disclosure. As described above, the third state means a state in which only one of the second frame 102 and the third frame 103 slidably moves so that the screen of the mobile terminal 100 is expanded by one half the entire screen size. For convenience of description, the following description will be given with reference to the second frame 102 moving in the first direction and the third frame 103 that does not slide, or with reference to the second frame 102 that does not slide and the third frame 103 moving in the first direction.

When the second frame 102 is pulled in the first direction, a fixing groove and a fixing protrusion 256 may be used to fix the third frame 103 so that the third frame 103 is not moved while being fixed to the first frame 101.

The fixing groove may have a concave shape formed in the first frame 101, and the fixing protrusion 256 may protrude from the third frame 103 at a position corresponding to the fixing groove. When the user presses a position corresponding to the fixing protrusion 256, the third frame 103 is fixed to the first frame 101 without being moved, so that only the second frame 102 can slide in the first direction.

Uneven portions 255 may be formed on the external appearance corresponding to the fixing protrusion 256, so that the user can easily recognize the position scheduled to be pressed. The fixing groove and the fixing protrusion 256 may be formed at upper and lower side surfaces arranged in the third direction so that the user can easily grasp the third frame 103. The fixing protrusion 256 may be formed to penetrate the third frame 103 using a separate member, so that one end of the fixing protrusion 256 may be inserted into the fixing groove and the other end 1025 of the fixing protrusion 256 may be exposed outside the second frame 102. The fixing groove 256 may be identical in shape to the second frame 102.

Each of the second frame 102 and the third frame 103 may further include a magnet that prevents the screen size from being changed due to unintended sliding movement of the second frame 102 and the third frame 103 in the first to third states during slide movement of the second or third frame 102 or 103. The mobile terminal 100 may include first magnets 251a and 251b that are included in the first frame 101 and are arranged in the first direction, and a second magnet 252 included in the second frame 102. In the first state, the second magnet 252 may be coupled to one 251a of the first magnets, and in the second state, the second magnet 252 may be coupled to the other first magnet 251b, so that the second magnet 252 may prevent the second frame 102 from being moved regardless of user intention. The first magnets 251a and 251b and the second magnet 252 may be symmetrically disposed on the upper and lower sides so as to stably fix the second frame 102. Similarly, the third frame 103 may include the second magnet 252 in the same manner as in the second frame 102.

In order to fix the second frame 102 and the third frame 103 that can be maintained in the first to third states, a recess may be formed at a position corresponding to each of the first magnets 251a and 251b, a protrusion may be formed at a position corresponding to the second magnet 252, and each of the recess and the protrusion may include a curved surface. As a result, when the user applies predetermined force to the curved surface, the second frame 102 and the third frame 103 can be easily separated from each other.

As described above, the mobile terminal according to the embodiments of the present disclosure does not limit a point where the flexible display unit 151 is bent to a specific position, thereby improving durability of the flexible display unit 151.

In addition, when the flexible display unit 151 is expanded, the embodiments of the present disclosure can stably support the expanded flexible display unit 151, so that sagging of the flexible display unit 151 can be prevented and occurrence of errors in touch input to the flexible display unit 151 can also be prevented.

The mobile terminal 100 according to the embodiments of the present disclosure can allow the flexible display unit 151 to stably move without being pushed in a switching mode between the first state and the second state.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

The invention claimed is:

1. A mobile terminal comprising:
a first frame;
a second frame configured to slidably move in a first direction with respect to the first frame or in a second direction opposite to the first direction;
a rotary gear rotatably coupled to the second frame about a rotary shaft extending in a third direction perpendicular to the first direction, and including a first portion and a second portion positioned in the third direction from the first portion;
a flexible display unit configured to include a first region coupled to a front surface of the first frame, and a second region that is bent while surrounding the rotary gear;
a first flexible rack gear coupled to the first frame and extending in the first direction, wherein the first flexible rack gear is disposed between the second region of the flexible display unit and the second frame, and formed to be bent while surrounding the first portion of the rotary gear; and
a second flexible rack gear coupled to a back surface of the flexible display unit, and configured to rotate while surrounding the second portion of the rotary gear,
wherein a length in the first direction of the first flexible rack gear is longer than a length in the first direction of the second flexible rack gear, and
wherein the first flexible rack gear rotates the rotary gear when the second frame slides and the rotating rotary gear moves the second flexible rack gear so that the second region moves.

2. The mobile terminal according to claim 1, wherein: in the rotary gear, the first portion formed to overlap the first flexible rack gear is larger in size than the second portion formed to overlap the second flexible rack gear.

3. The mobile terminal according to claim 2, wherein:
a diameter of the first portion of the rotary gear is equal to a diameter of the second portion of the rotary gear; and
a serrated pitch of the first flexible rack gear is equal to a serrated pitch of the second flexible rack gear.

4. The mobile terminal according to claim 2, wherein:
a diameter of the second portion of the rotary gear is larger in size than a diameter of the first portion of the rotary gear; and
a serrated pitch of the second flexible rack gear is larger in size than a serrated pitch of the first flexible rack gear.

5. The mobile terminal according to claim 1, wherein:
one pair of the second flexible rack gears is arranged in the third direction; and
the first flexible rack gear is disposed between the two second flexible rack gears making the one pair.

6. The mobile terminal according to claim 1, wherein the first flexible rack gear includes:
a plurality of curved uneven portions formed on a surface facing the flexible display unit.

7. The mobile terminal according to claim 6, wherein:
the plurality of curved uneven portions is formed to extend in the third direction, and is arranged side by side in the first direction.

8. The mobile terminal according to claim 1, wherein:
the first flexible rack gear further includes at least one guide protrusion located at both side surfaces arranged in the third direction; and
the second frame further includes a guide rail formed to cover both side surfaces arranged in the second direction and formed to include a guide rail into which the guide protrusion is inserted.

9. The mobile terminal according to claim 1, further comprising:
a plurality of first magnets disposed in the first frame, and arranged in the first direction; and
a second magnet disposed in the second frame,
wherein the second magnet is magnetically coupled to one of the plurality of first magnets when the second frame moves in the first direction.

10. The mobile terminal according to claim 1, further comprising:
a third frame configured to move in the second or first direction with respect to the first frame, and disposed symmetrical to the second frame;
a fixing groove formed in the first frame; and
a fixing protrusion formed in each of the second frame and the third frame, and inserted into the fixing groove when pressed.

11. The mobile terminal according to claim 1, wherein the second frame further includes:
a slide rail extending in the first direction such that both ends arranged in the third direction of the slide rail are configured to accommodate ends of the flexible display unit.

* * * * *